(12) United States Patent
Hieda et al.

(10) Patent No.: US 11,436,716 B2
(45) Date of Patent: Sep. 6, 2022

(54) ELECTRONIC APPARATUS, ANALYSIS SYSTEM AND CONTROL METHOD OF ELECTRONIC APPARATUS

(71) Applicant: CANON KABUSHIKI KAISHA, Tokyo (JP)

(72) Inventors: Teruo Hieda, Yokohama (JP); Masaki Ishii, Kawasaki (JP); Toshimasa Suzuki, Kawasaki (JP); Junko Tajima, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 16 days.

(21) Appl. No.: 16/844,833

(22) Filed: Apr. 9, 2020

(65) Prior Publication Data
US 2020/0334806 A1 Oct. 22, 2020

(30) Foreign Application Priority Data

| Apr. 19, 2019 | (JP) | JP2019-080190 |
| Apr. 19, 2019 | (JP) | JP2019-080191 |
| Apr. 19, 2019 | (JP) | JP2019-080192 |

(51) Int. Cl.
  *G06T 7/00* (2017.01)
(52) U.S. Cl.
  CPC .. *G06T 7/0004* (2013.01); *G06T 2207/10116* (2013.01); *G06T 2207/10152* (2013.01); *G06T 2207/20081* (2013.01); *G06T 2207/30128* (2013.01)
(58) Field of Classification Search
  CPC ......... G06T 7/0004; G06T 2207/10152; G06T 2207/20081; G06T 2207/30128; G01N 21/84; G01N 21/65; G01N 2021/845; G01N 21/31

USPC ....... 382/100, 110, 132, 155, 168, 173, 181, 382/190, 191, 224, 225, 274, 275, 276, 382/305, 312; 356/300, 326, 328, 332, 356/331, 334, 445

See application file for complete search history.

(56) References Cited

U.S. PATENT DOCUMENTS

| 5,088,822 A | * | 2/1992 | Kanda | G01N 33/12 356/326 |
| 5,428,657 A | * | 6/1995 | Papanicolopoulos | G01N 23/20083 378/86 |
| 6,198,834 B1 | * | 3/2001 | Belk | A22B 5/007 348/89 |

(Continued)

FOREIGN PATENT DOCUMENTS

| JP | 2018-066649 A | 4/2018 |
| JP | 2018-136189 A | 8/2018 |

*Primary Examiner* — Sheela C Chawan
(74) *Attorney, Agent, or Firm* — Canon U.S.A., Inc. IP Division

(57) ABSTRACT

An electronic apparatus includes a selection unit configured to select any one of a plurality of parameters generated in advance, and an analysis unit configured to receive light reflected from food to be analyzed and perform an analysis of spectral data by using the parameter selected by the selection unit, the spectral data indicating spectral intensities of a plurality of spectral components, wherein the selection unit is configured to select any one of the plurality of parameters based on at least any one of a type of the food to be analyzed, a demanded accuracy of the analysis, and processing to be performed after the analysis.

13 Claims, 9 Drawing Sheets

(56) References Cited

U.S. PATENT DOCUMENTS

| | | | | |
|---|---|---|---|---|
| 6,434,496 | B1* | 8/2002 | Dong | G01J 3/28 |
| | | | | 324/76.21 |
| 6,649,412 | B1* | 11/2003 | Borggaard | A22C 17/008 |
| | | | | 436/20 |
| 8,774,469 | B2* | 7/2014 | Subbiah | G01J 3/2803 |
| | | | | 382/110 |
| 8,993,964 | B2* | 3/2015 | Priore | G01N 21/65 |
| | | | | 250/338.1 |
| 2009/0087033 | A1* | 4/2009 | Chao | A22C 21/00 |
| | | | | 382/110 |
| 2012/0035276 | A1* | 2/2012 | Spievack | A61L 27/3633 |
| | | | | 514/772 |
| 2014/0293277 | A1* | 10/2014 | Subbiah | G01J 3/02 |
| | | | | 356/300 |
| 2019/0293620 | A1* | 9/2019 | Farkas | G01N 21/65 |

\* cited by examiner

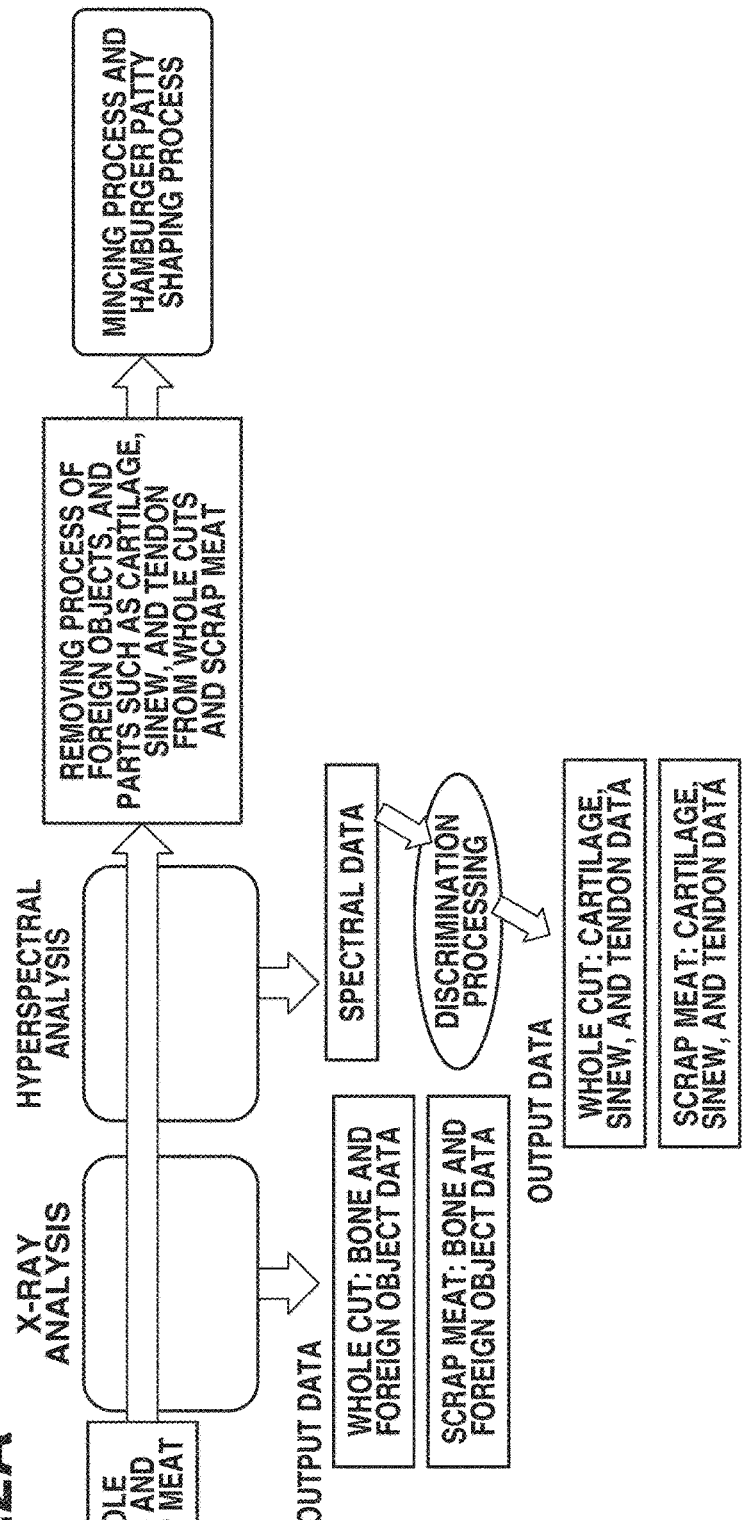
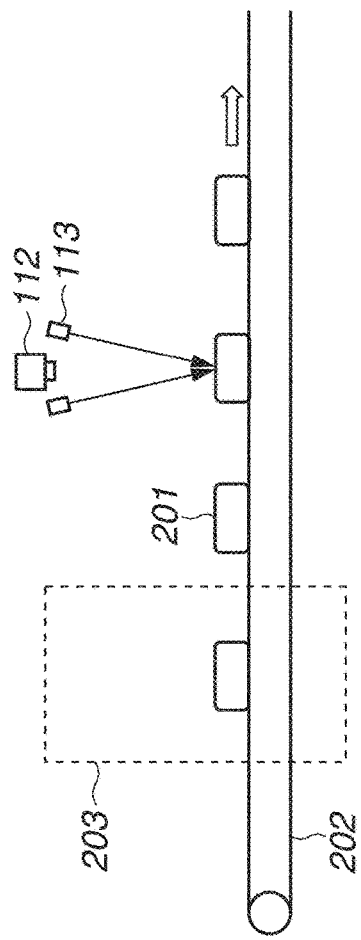
FIG.2A
FIG.2B

FIG.9A
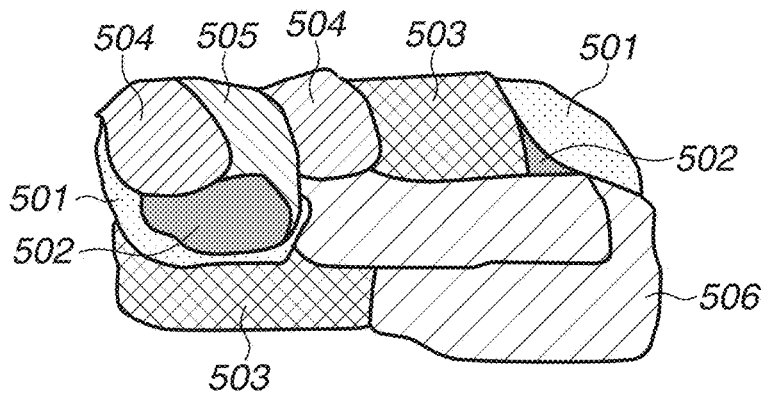
FIG.9B
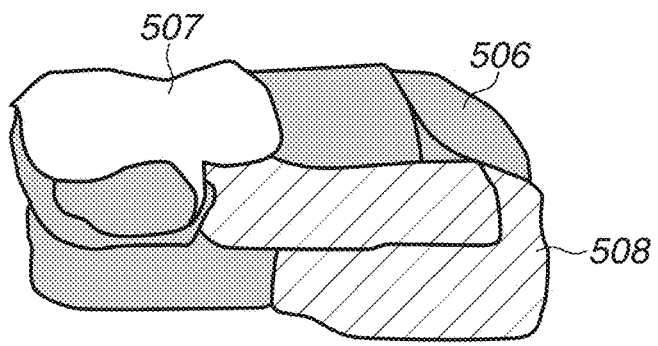
FIG.9C
| | |
|---|---|
| LEAN | 20% |
| FAT | 10% |
| CARTILAGE | 7% |
| SINEW | 10% |
| TENDON | 13% |
| UNKNOWN | 40% |
FIG.9D
| | |
|---|---|
| NG | 30% |
| OK | 30% |
| UNKNOWN | 40% |
FIG.9E
| | |
|---|---|
| NG | 30% |
| OK | 30% |
| FAT/SINEW | 25% |
| LEAN/CARTILAGE | 15% |
FIG.9F
NG 30%
OK 30%
FAT/SINEW 25%: HIGH PROBABILITY OF SINEW BEING MORE THAN OR EQUAL TO ONE HALF
LEAN/CARTILAGE 15%: HIGH PROBABILITY OF CARTILAGE BEING MORE THAN OR EQUAL TO ONE HALF
FIG.9G
NG  30% + (22%)
OK  30% + (15%)

ELECTRONIC APPARATUS, ANALYSIS SYSTEM AND CONTROL METHOD OF ELECTRONIC APPARATUS

BACKGROUND OF THE INVENTION

Field of the Invention

The present disclosure relates to an electronic apparatus and a control method thereof. In particular, the present disclosure relates to a technique for analyzing a target by using a plurality of spectral components.

Description of the Related Art

Analyzing using light have been used in recent years. Japanese Patent Application Laid-Open No. 2018-066649 discusses a method by which a cut surface of meat is irradiated with visible light, and using a plurality of images each corresponding to a different wavelength of the visible light, bone and fat areas in the images are extracted. Japanese Patent Application Laid-Open No. 2018-136189 discusses a method by which, from a spectroscopic image obtained by infrared spectroscopy, spectral data is extracted and whether a pill is a non-defective or a different type of pill is determined.

In factories, various foods are processed. Even in the case of meat, different types of meat such as beef, chicken, and pork, and meats of different places of production have different characteristics. Japanese Patent Application Laid-Open No. 2018-066649 does not include a discussion of how pieces of meat are discriminated in a case where the type or place of production of the meat changes. Therefore, according to a method discussed in Japanese Patent Application Laid-Open No. 2018-066649, an accurate analysis may not be performed if the characteristics of the food to be analyzed change.

If an analysis undesirably more detailed than the level intended for the analysis result is attempted, the processing time for the analysis increases uselessly and can lower the entire processing efficiency.

According to Japanese Patent Application Laid-Open No. 2018-066649, a target is irradiated with light to obtain higher signal levels of spectral components from the sensor, to easily analyze characteristics of spectral components.

However, the analysis target irradiated with light is affected by heat from the light. In particular, if food, such as meat which easily affected by heat, is irradiated with too much amount of light, the analysis target can be damaged.

Japanese Patent Application Laid-Open No. 2018-136189 does not include a discussion of how an inspection result is presented to the user and processing based on the inspection result is to be performed if an inspection is followed by actual processing or by other processes such as another inspection and product processing.

SUMMARY OF THE INVENTION

The present disclosure is directed to providing an apparatus or method for achieving both a high accuracy of analysis and improved efficiency in a compatible manner in analyzing a target by using a plurality of spectral components.

The present disclosure is also directed to providing an apparatus or method for achieving both a high accuracy of analysis and protection of an analysis target in a compatible manner in analyzing the target by using a plurality of spectral components.

The present disclosure is also directed to providing an apparatus or method for outputting a result of an inspection performed in the process of executing predetermined processing.

According to an aspect of the present disclosure, an electronic apparatus includes a selection unit configured to select any one of a plurality of parameters generated in advance, and an analysis unit configured to receive light reflected from food to be analyzed and perform an analysis of spectral data by using the parameter selected by the selection unit, the spectral data indicating spectral intensities of a plurality of spectral components, wherein the selection unit is configured to select any one of the plurality of parameters based on at least any one of a type of the food to be analyzed, a demanded accuracy of the analysis, and processing to be performed after the analysis.

Further features of the present disclosure will become apparent from the following description of exemplary embodiments with reference to the attached drawings.

BRIEF DESCRIPTION OF THE DRAWINGS

FIGS. 2A and 2B are diagrams illustrating meat discrimination processing according to the first exemplary embodiment.

FIGS. 9A, 9B, 9C, 9D, 9E, 9F, and 9G are diagrams illustrating examples of a method for displaying an inspection result according to the first exemplary embodiment.

DESCRIPTION OF THE EMBODIMENTS

Exemplary embodiments of the present disclosure will be described in detail below with reference to the accompanying drawings.

It is to be noted that the following exemplary embodiments are merely one example for implementing the present disclosure and can be appropriately modified or changed depending on individual constructions and various conditions of apparatuses to which the present disclosure is applied. Thus, the present disclosure is in no way limited to the following exemplary embodiments.

Exemplary embodiments of the present disclosure will be specifically described below with reference to the drawings. While specific examples described below are examples of the best mode for carrying out the present disclosure, the present disclosure is not limited to such specific examples.

A first exemplary embodiment will initially be described below with reference to FIGS. 1 to 4.

Figure 1:
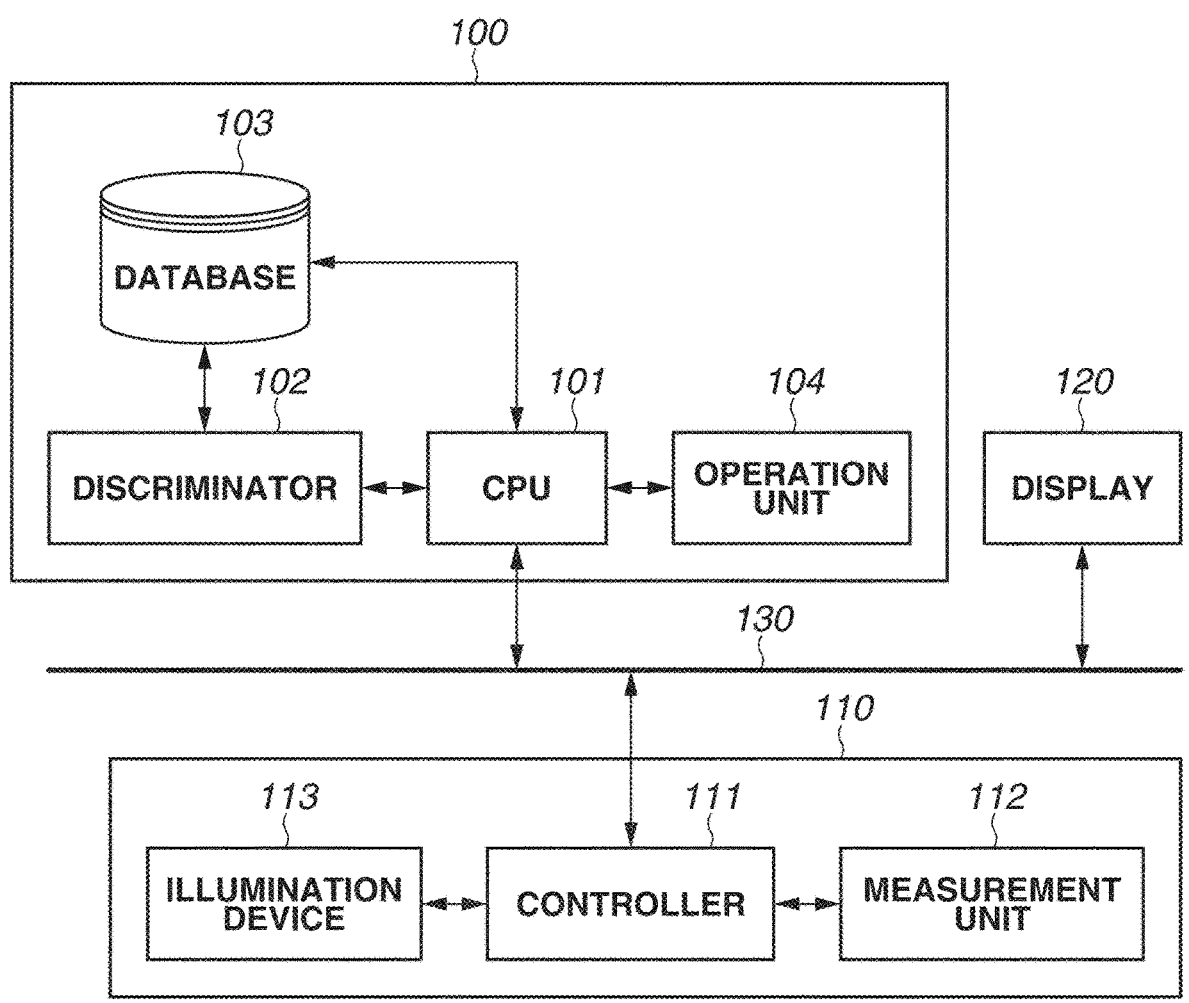
FIG. 1 is a block diagram illustrating a configuration of an analysis system according to a first exemplary embodiment.

A configuration of an analysis system according to the present exemplary embodiment will initially be described with reference to FIG. 1. FIG. 1 is a block diagram illustrating the configuration of the analysis apparatus according to the present exemplary embodiment.

The analysis system according to the present exemplary embodiment includes an electronic apparatus 100, a measurement apparatus 110, and a display 120. The electronic apparatus 100, the measurement apparatus 110, and the display 120 are connected partly or entirely via a network 130. The configuration illustrated in FIG. 1 is just an example. The components may be provided separately from each other in different apparatuses in a distributed manner, or may be integrated into one apparatus. The electronic apparatus 100 is connected to a not-illustrated apparatus for performing meat processing in a factory to communicate with each other, and controls the apparatus. The network 130 includes a local area network (LAN) and the Internet.

The electronic apparatus 100 includes a central processing unit (CPU) 101, a discriminator 102, a database 103, and an operation unit 104.

The CPU 101 is an arithmetic circuit that controls an overall operation of the electronic apparatus 100 based on a program stored in a not-illustrated memory. The CPU 101 controls the measurement apparatus 110, and causes the discriminator 102 to analyze spectral data obtained from the measurement apparatus 110. The discriminator 102 includes a graphics processing unit (GPU) or a field-programmable gate array (FPGA). In the present exemplary embodiment, discrimination parameters generated by machine learning and stored in the database 103 are set in the discriminator 102. The discriminator 102 performs processing for determining parts of meat to be analyzed by using the spectral data obtained from measurement apparatus 110. The database 103 stores discrimination parameters generated by performing machine learning in a cloud computing environment or on a server in advance. A plurality of types of discrimination parameters is prepared based on the types of analysis targets, analytical levels, or teaching data, and discrimination parameters selected by the CPU 101 are used for the discrimination processing by the discriminator 102. The operation unit 104 is an input device for accepting user operations, and includes a text information input device such as a keyboard, a pointing device such as a mouse and a touch panel, a button, a dial, a joystick, a touch sensor, and/or a touch pad. A touch panel is an input device that is flatly configured to overlie the display 120, and outputs coordinate information based on a touched position.

The measurement apparatus 110 includes a controller 111, a measurement unit 112, and an illumination device 113. The controller 111 communicates with the CPU 101 and controls the entire measurement apparatus 110 based on instructions from the CPU 101.

The measurement unit 112 is controlled by the controller 111, measures a signal level of each spectral component from a not-illustrated piece of meat to be analyzed, and generates spectral data.

The spectral data is not limited in particular as long as the data indicates each signal level (spectral intensities) of a different one of plurality of spectral components. For example, data containing response intensities (signal levels corresponding to spectral intensities) of a response to a stimulus given to the meat to be analyzed, associated with measurement parameters (corresponding to spectral components), may be used as the spectral data. Examples of the "stimulus" here include electromagnetic waves, sound, an electromagnetic field, temperature, and humidity.

If the spectral data is optical spectral data in an ultraviolet, visible, or infrared range, or Raman spectral data, the spectral components can be wavelengths or wave numbers.

If the spectral data is mass spectral data, the spectral components may be mass-to-charge ratios or mass numbers.

Each of the spectral data belongs to any one of groups corresponding to a plurality of components in the meat to be analyzed. The spectral components and the spectral intensities vary depending on the respective components of the meat to be analyzed, included in a measurement area where the spectral data is obtained. The group to which spectral data belongs can be discriminated by analyzing the spectral data, whereby each piece of spectral data can be attributed to a different component.

In the present exemplary embodiment, the spectral components are several tens to several hundreds of types of wavelength components in the visible and near infrared wavelength bands. The measurement unit 112 includes an image sensor having filters corresponding to the respective wavelengths, or a line sensor that receives light dispersed by a diffraction grating.

The illumination device 113 includes a light source for irradiating the meat to be analyzed. In the present exemplary embodiment, a halogen lamp that emits near infrared rays and visible light is used. The irradiation of meat by the halogen lamp can increase the intensities of the spectral components reflected from the meat.

The display 120 displays a discrimination result of the electronic apparatus 100. For example, a liquid crystal display or an organic electroluminescence (EL) display can be used as the display 120. The display 120 can display image data transmitted via the network 130.

Next, meat processing processes according to the present exemplary embodiment will be described with reference to FIGS. 2A and 2B. Meat to be processed is delivered to the processing factory by a meat wholesaler or livestock farmer. Meats to be processed in the meat processing processes include whole cuts that are lumps of meat having mostly the same part, and scrap meat that is an aggregate of pieces of meat having various parts and not classified in the whole cuts. In the present exemplary embodiment, meat processing processes for making hamburger patties will be described as an example. However, the present exemplary embodiment is not limited thereto. It will be understood that the present exemplary embodiment is also applicable to sausages and other processed meat products.

For quality control of meat, both whole cuts and scrap meat are sent to the meat processing processes in a frozen state. In particular, scrap meat is a large block having pieces of meat of various parts.

A description will be given below with reference to FIG. 2A. An X-ray based analysis (hereinafter, may be referred to as X-ray analysis) is initially performed to detect bones included in whole cuts and scrap meat and check for foreign objects. Whole cuts of meat and lumps of scrap meat are put in a row on a belt conveyer for analysis. If there are bones or foreign objects, the bones or foreign objects are removed in a subsequent process. The X-ray analysis can be performed at a belt conveyer speed of 15 m/min or 25 m/min.

Next, an analysis using a hyperspectral camera that can simultaneously emit a wide wavelength range of light, referred to as a hyperspectral analysis in the present exemplary embodiment, is performed. While the hyperspectral analysis assuming the use of several tens to several hundreds of wavelength-specific outputs is employed here, the present exemplary embodiment is also applicable to a multispectral analysis assuming the use of several wavelength-specific outputs.

In the hyperspectral analysis, the discriminator 102 performs discrimination processing on the spectral data obtained by the measurement apparatus 110 by using the discrimination parameters obtained based on machine learning. The discriminator 102 then outputs a result about at which positions cartilage, sinew, and tendon are, or whether cartilage, sinew, and tendon are included in the meat.

Like the X-ray analysis, the hyperspectral analysis is also performed with the pieces of meat on the belt conveyer. The belt conveyer is therefore desirably operable at the same speed as with the X-ray analysis. If the discriminator 102 takes a long time to output a discrimination result, more hyperspectral cameras can be installed than the X-ray device or the number of discriminators 102 can be increased. After the X-ray analysis and the hyperspectral analysis, bones, foreign objects, and parts such as cartilage, sinew, and tendon are removed. The resulting whole cuts and scrap meat are minced and conveyed to a process for shaping hamburger patties.

Next, how the X-ray and hyperspectral analyses are performed will be described with reference to FIG. 2B. In the present exemplary embodiment, the X-ray and hyperspectral analyses of meat 201 are performed on a belt conveyer 202. As illustrated in FIG. 2B, the meat 201 that is either scrap meat or a whole cut is conveyed on the belt conveyer 202. An X-ray analysis apparatus 203 initially performs an analysis, and then the analysis system according to the present exemplary embodiment performs a hyperspectral analysis. The belt conveyer 202 moves in the direction of the arrow illustrated in FIG. 2B. Each analysis is thus performed by applying light waves to the meat 201 from above. The light used in the hyperspectral analysis reaches only the areas closer to the surface of the analysis target, compared to the X-rays used in the X-ray analysis. The result of the hyperspectral analysis is thus limited to information about a shallower range from the irradiation surface, compared to the result of the X-ray analysis. For the purpose of the hyperspectral analysis, the meat to be analyzed is therefore desirably sliced in the range of 2 to 5 cm in thickness. Alternatively, for example, the meat 201 can be sliced in a thickness such as 10 cm or 8 cm, and both sides of the meat 201 can be analyzed. Based on the analysis result, the meat 201 is classified between the following three patterns: meat that can be simply sent to a normal mincing process (referred to as pattern A); meat that is further subjected to a manual determination (referred to as pattern B); and meat that should not be simply sent to the normal mincing process (referred to as pattern C). Whole cuts may be excluded from the X-ray analysis and the hyperspectral analysis since what part of meat the whole cuts are is known in the phase of producing the whole cuts. In such a case, only scrap meat is subjected to the X-ray analysis and the hyperspectral analysis.

The illumination device 113 includes a pair of light sources that emit directional light and are located with the measurement unit 112 therebetween. The directions of emission of the light sources are tilted in directions opposite to each other with respect to a vertical direction. By emitting light in different angles, either one of the light sources can irradiate parts shadowed by irradiation by the other light source. In addition, the analysis target can be irradiated with a greater amount of light by concentrating the light emitted from both the light sources at a position.

Figure 3B:
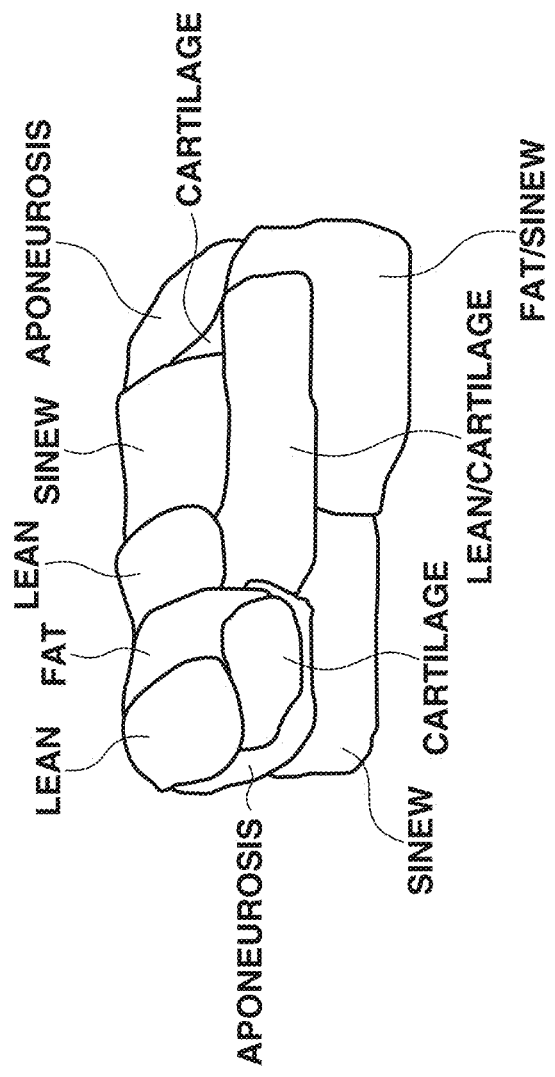
FIGS. 3A and 3B are diagrams illustrating a lump of meat.
Figure 3A:
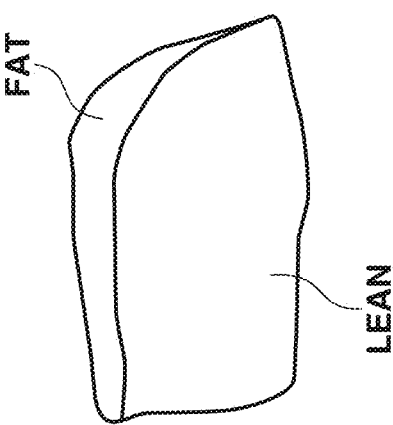

Next, a lump of meat called scrap meat according to the present exemplary embodiment will be described with reference to FIGS. 3A and 3B. FIG. 3A illustrates an example of a whole cut. FIG. 3B illustrates an example of scrap meat. FIG. 3A illustrates a whole cut including lean and fat. Since the positional relationship between parts in a whole cut is known, the absence of cartilage in the whole cut including the lean and fat illustrated in FIG. 3A, for example, can be determined without analysis. As illustrated in FIG. 3B, scrap meat is aggregate of small cuts formed regardless of the original positional relationship between the parts.

Figure 4:
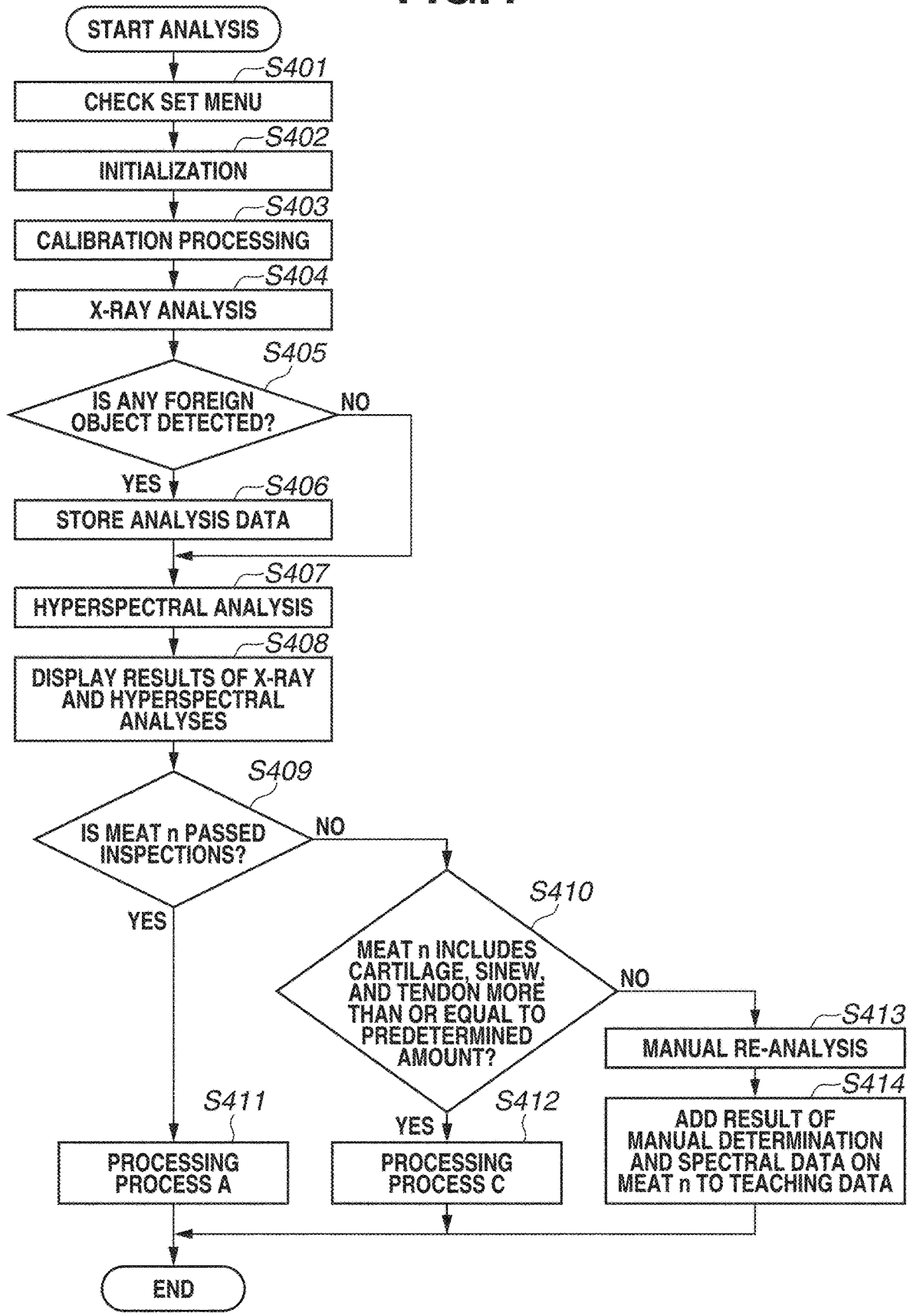
FIG. 4 is a flowchart illustrating analysis processing according to the first exemplary embodiment.

Meat analysis processing according to the present exemplary embodiment will be described with reference to FIG. 4. FIG. 4 illustrates a flowchart of the meat analysis processing. This processing corresponds to the X-ray analysis and the hyperspectral analysis in FIGS. 2A and 2B.

The meat analysis processing is implemented by the CPU 101 performing processing based on the program stored in the not-illustrated memory.

In step S401, the CPU 101 checks a set menu. The menu includes the type of meat, the place of production, a status (whole cut or scrap meat), the type and level of a process performed after analysis, and a corresponding cooking style (such as hamburger patties and chopped meat). Such menu settings can be made by user inputs or based on a preset schedule.

In step S402, the CPU 101 performs initialization based on the set menu. The CPU 101 initially selects some of discrimination parameters that are obtained by machine learning and stored in the database 103 based on the menu, and sets the selected discrimination parameters into the discriminator 102. The discrimination parameters about meat differ from beef to pork to chicken. Even for beef, different discrimination parameters may desirably be used depending on the type and the place of production.

Different discrimination parameters may also be used even for meat of the same type and the same place of production, depending on the processes to be applied to the analyzed meat. For example, the allowable range of tendon, sinew, or cartilage included in meat differs depending on whether the analyzed meat is to be finely minced or coarsely minced. Different discrimination parameters may be used based on whether the meat is a whole cut of a known part or scrap meat of mixed parts, since the demanded accuracy of analysis is different.

Spectral components of interest may be changed depending on the type, the place of production, or the status of meat. Specifically, the spectral components of interest in the spectral data obtained by the measurement unit 112 may be specified based on the set menu. Useless spectral components with little significance in discrimination may be excluded from use. Spectral components to be weighed heavily as determination criteria may be changed depending on the part to be discriminated, whether tendon, sinew, or cartilage.

The CPU 101 may adjust the amount of light of the illumination device 113 based on the driving speed of the belt conveyer 202 (moving speed of meat) or the distance from the illumination device 113 to the meat 201 to be analyzed. Since the light emitted from the illumination device 113 has heat, too much amount of light can damage the meat. On the other hand, too little amount of light makes accurate analysis difficult since the spectral components reaching the measurement unit 112 decrease. The lower the driving speed of the belt conveyer 202, the longer the irradiation time of the meat 201 by the illumination device 113 and the more likely the meat 201 is to be affected by heat. The CPU 101 thus reduces the amount of light of the illumination device 113. The smaller the distance between the light sources of the illumination device 113 and the meat 201, the more likely the meat 201 is to be affected by heat. As described above, the CPU 101 reduces the amount of light of the illumination device 113. In such a manner, the CPU 101 adjusts the amount of light of the illumination device 113 based on the driving speed of the belt conveyer 202 or the distance from the illumination device 113 to the meat 201 to be analyzed, by referring to data measured in advance or obtained by experiment.

The distance from the illumination device 113 to the meat 201 to be analyzed may be previously measured and input by the user, or estimated from the distance between the two light sources of the illumination device 113 and the tilts of the light sources with respect to the vertical direction. For example, a motor for changing the tilts of the two light sources of the illumination device 113 may be provided, and image data may be generated from the spectral data obtained by an image sensor of the measurement unit 112. The CPU 101 may automatically adjust the tilts of the light sources so that the positions of light emitted from the two light sources coincide with each other in the image data.

The amount of light of the illumination device 113 may be adjusted based on the type of food to be analyzed. The effect of heat from the light emitted from the light sources varies in magnitude depending on the degree of freezing and the type of food to be analyzed. The amount of light of the illumination device 113 may thus be adjusted based on the heat tolerance of the food to be analyzed. For example, the lower the heat tolerance, the smaller the amount of light may be adjusted to be.

Hard sinew is more easily discriminated from lean and fat than relatively soft sinew is. In a case where soft sinew does not need to be discriminated, discrimination is therefore more likely to succeed with small outputs of spectral components compared to where soft sinew is to be discriminated. If the demanded accuracy of analysis can thus be lowered, the amount of light of the illumination device 113 may be reduced.

A slicer for slicing up the food to be placed on the belt conveyer 202 may be disposed, and the thickness for the slicer to slice the food in may be changed based on the type of food.

In step S403, the CPU 101 performs calibration processing. The spectral data obtained by the measurement unit 112 can vary due to the effects of the brightness and lighting in the factory and illumination devices used in other production lines. The CPU 101 then performs white balance processing for adjusting the gains to be applied to the respective spectral components based on spectral data obtained by capturing an image of the belt conveyer 202 that is uniform in color, and performs calibration processing on the spectral data. After the completion of the calibration processing, the CPU 101 notifies the user that preparations for the X-ray and hyperspectral analyses are completed.

In step S404, the CPU 101 causes the X-ray analysis apparatus 203 perform an X-ray analysis on the meat 201 conveyed by the belt conveyer 202 to detect foreign objects such as a piece of metal and bone included in the meat 201. The X-ray analysis can be performed by using a conventional method.

In step S405, in a case where any foreign object is detected as a result of the X-ray analysis in step S404 (YES in step S405), the processing proceeds to step S406. In a case where no foreign object is detected (NO in step S405), the processing proceeds to step S407.

In step S406, the CPU 101 stores analysis data DXn in the not-illustrated memory. n is a number for identification, assigned to each piece of scrap meat or whole cut. The analysis data DXn may indicate only information about the presence or absence of a bone or foreign object, or include coordinate information indicating where the bone or foreign object is. The analysis data DXn may be image data indicating whether a bone or foreign object is included. If a bone is included in a whole cut, the analysis data DXn may include information about the presence or absence of the bone. If a bone is included in scrap meat, the analysis data DXn may include information including the presence or absence of the bone and the position of the bone. If a whole cut includes a bone, almost the entire lump is likely to be bone. By contrast, if scrap meat includes a bone, the lump is likely to be bone in part. In the case of a whole cut, the indication of the presence or absence of a bone therefore enables a quick understanding of whether the lump itself can be used for processing. On the other hand, in the case of scrap meat, with the indication of the position of a bone, processing for removing the bone can be performed afterward. The analysis data DXn may indicate the ratio or area of bones included. The result of the X-ray analysis may be displayed on the display 120 before the analysis using the hyperspectral camera. If the ratio or size of bones (in a piece of meat) is determined to be greater than or equal to a threshold, the whole cut or scrap meat may be discarded or used for other processing without a hyperspectral analysis.

In step S407, the CPU 101 performs a hyperspectral analysis on the meat 201 subjected to the X-ray analysis. The meat 201 on the belt conveyer 202 is irradiated with light from the illumination device 113. The measurement unit 112 receiving reflected light from the meat 201 generates signal levels corresponding to several tens to several hundreds of types of wavelength components, respectively, and outputs the signal levels as spectral data. The spectral data includes the signal levels of the respective spectral components at every two-dimensional coordinates corresponding to the image sensor. Specifically, the spectral data can be expressed as (x, y, u, v), where (x, y) is two-dimensional coordinates corresponding to the image sensor, (u) is a spectral component, and (v) is a signal level.

Machine learning based on deep learning using a deep convolutional neural network is performed in advance by using a cloud computing environment or a server with a group of pieces of spectral data about part-determined meat as teaching data, to generate a trained model for the discriminator 102. Discrimination parameters corresponding to the trained model are stored in the database 103 of the electronic apparatus 100. This enables the discriminator 102 to discriminate which portion of the meat 201 corresponds to which part by analyzing the spectral data obtained from the measurement apparatus 110.

Teaching data to be used for the machine learning includes positive data and negative data. For the purpose of removing cartilage, sinew, and tendon, positive data refers to spectral data about meat where parts corresponding to cartilage, sinew, and tendon are determined. By contrast, for the purpose of removing cartilage, sinew, and tendon, negative data refers to spectral data about meat where other parts corresponding to lean and fat are determined. Machine learning using the positive data enables the discriminator 102 to discriminate parts such as cartilage, sinew, and tendon. Machine learning using the negative data enables the discriminator 102 to discriminate parts where cartilage, sinew, and tendon are less likely to be included.

Image data and spectral data about cartilage, sinew, and tendon to be removed are unlikely to have been deliberately accumulated before. It can therefore take time to accumulate a sufficient amount of positive data to discriminate such parts. For this reason, a trained model generated by performing negative data-based machine learning using spectral data corresponding to lean and fat, which is relatively easy to prepare, is initially used. The trained model is then switched to one based on positive data, or one using both negative data and positive data, after a sufficient amount of spectral data corresponding to cartilage, sinew, and tendon is accumulated. If cartilage, sinew, and tendon do not need to be distinguished, the trained model based on the negative data may be used alone.

While the discriminator 102 discriminates parts in units of coordinates of the spectral data, a discrimination result can be erroneous. The CPU 101 may thus group adjoining coordinates at which parts are determined to be the same, and if the group has an areal size smaller than a threshold, determine that the discrimination result is likely to be erroneous. Alternatively, the CPU 101 may determine a degree (level) of distribution of each part over the two-dimensional coordinates, and use the discrimination results of areas where the discrimination results are determined to be dense.

As described with reference to FIGS. 3A and 3B, the positional relationship between parts of a whole cut is known in advance. Machine learning on such spectral data can thus be performed not in units of coordinates but in units of areas each including a plurality of coordinates. This enables the discriminator 102 to discriminate parts by also taking into account a relative positional relationship between parts. By contrast, scrap meat is an aggregate formed regardless of the positional relationship between the original parts, and machine learning is desirably performed in units of coordinates or in units of extremely small areas.

In step S408, the CPU 101 obtains hyperspectral analysis data DMn from the discriminator 102. n is a number for identification, assigned to each lump of scrap meat or whole cut. The analysis data DMn includes data indicating the sizes and ratios of respective parts, data indicating the positions of the respective parts, and data indicating whether cartilage, sinew, and/or tendon of predetermined size or more is/are included.

If cartilage, sinew, and/or tendon of predetermined size or more, for example, greater than or equal to 20% of the area of the scrap meat is/are included, the meat is recorded in data as not good (NG), and determined to be of the foregoing pattern C. On the other hand, if no cartilage, sinew, or tendon is determined to be found, the meat is determined to be of the foregoing pattern A. The analysis data DMn includes information about the areas of the respective parts. Since what the operator (user) wants to know by the current analysis is information about, e.g., cartilage, sinew, and tendon, detailed information about how much cartilage, sinew, and tendon are included at which positions may be obtained while information only about rough ratios are obtained about lean and fat. Obtaining detailed information about parts of interest and only rough information about other parts in such a manner can reduce the processing load of the discriminator 102 with reduced analysis time. The CPU 101 displays the result of the X-ray analysis and the result of the hyperspectral analysis on the display 120.

In step S409, if the meat 201 is clearly passed inspection (hereinafter, referred to as OK) (meat of pattern A) with no cartilage, sinew, or tendon found (YES in step S409), the processing proceeds to step S411. If not (NO in step S409), the processing proceeds to step S410.

In step S410, if the meat 201 includes cartilage, sinew, and tendon more than or equal to a predetermined amount and is clearly fails inspection (hereinafter, referred to as NG)(meat of pattern C)(YES in step S410), the processing proceeds to step S412. If not (NO in step S410), the processing proceeds to step S413. If it is unknown whether the meat 201 is of pattern C or not (pattern B), the processing proceeds to step S413. For example, suppose that meat is determined to be of pattern C if the meat includes 20% or more of cartilage and sinew. In such a case, if the meat 201 includes 18% of cartilage and sinew and 10% of a mixture of cartilage and lean, the processing proceeds to step S413. In such a manner, if the threshold for making a determination of the pattern C is not clearly exceeded, the processing proceeds, unlike the case of pattern C, to step S413. This can reduce the amount of meat not to be used to make hamburger patties.

In step S411, the CPU 101 sends the meat n to processing process A that is mincing processing for making hamburger patties. While the processing for making hamburger patties is described as an example of the processing process A, the processing process A may be a process for processing the analyzed meat for the purpose of cooking or preparation set by the menu in advance.

In step S412, the CPU 101 sends the meat n to processing process C other than hamburger patty making processing. For example, if scrap meat is determined to be clearly NG in step S410, the scrap meat may be minced more finely than usual, used for other processed food of which different texture is desired, or used to make soup stock.

In step S413, the human operator analyzes the meat n again. Based on the result of the manual re-analysis, the CPU 101 determines again whether the meat n is of pattern A or pattern C.

In step S414, the CPU 101 adds the result of the manual determination obtained in step S413 and the spectral data on the meat n to teaching data for reinforcing the trained model of the discriminator 102. The meat n in the processing of step S413 is considered to not be fully machine-learned. The determination result of step S413 and the spectral data are therefore transmitted to the cloud computing environment or server and used as teaching data for reinforcing the machine learning.

The processing of steps S404 to S414 is repeated while pieces of meat 201 are conveyed on the belt conveyor 202. The flowchart of FIG. 4 ends if an instruction to end the hyperspectral analysis is given by the operator.

As described above, the present exemplary embodiment changes the parameters used for analysis accordingly if the type, place of production, or cooking method of food to be analyzed changes. Both a high accuracy of analysis and improved efficiency can thus be achieved in a compatible manner in analyzing a target by using a plurality of spectral components.

As described above, the present exemplary embodiment adjusts the amount of light of the illumination unit based on the moving speed of the food or the distance between the food and the illumination unit. Both a high accuracy of analysis and the protection of the analysis target can thus be achieved in a compatible manner in analyzing the target by using a plurality of spectral components.

An exemplary embodiment of the present disclosure can also be implemented by performing the following processing. The processing includes supplying software (program) for implementing the functions of the foregoing first exemplary embodiment to a system or an apparatus via a network or various recording media, and reading and executing the program code by a computer (or CPU or microprocessor (MPU)) of the system or apparatus. In such a case, the program and a recording medium storing the program constitute exemplary embodiments of the present disclosure.

Next, the rest of the first exemplary embodiment will be described with reference to FIGS. 5 to 9G.

Figure 5:
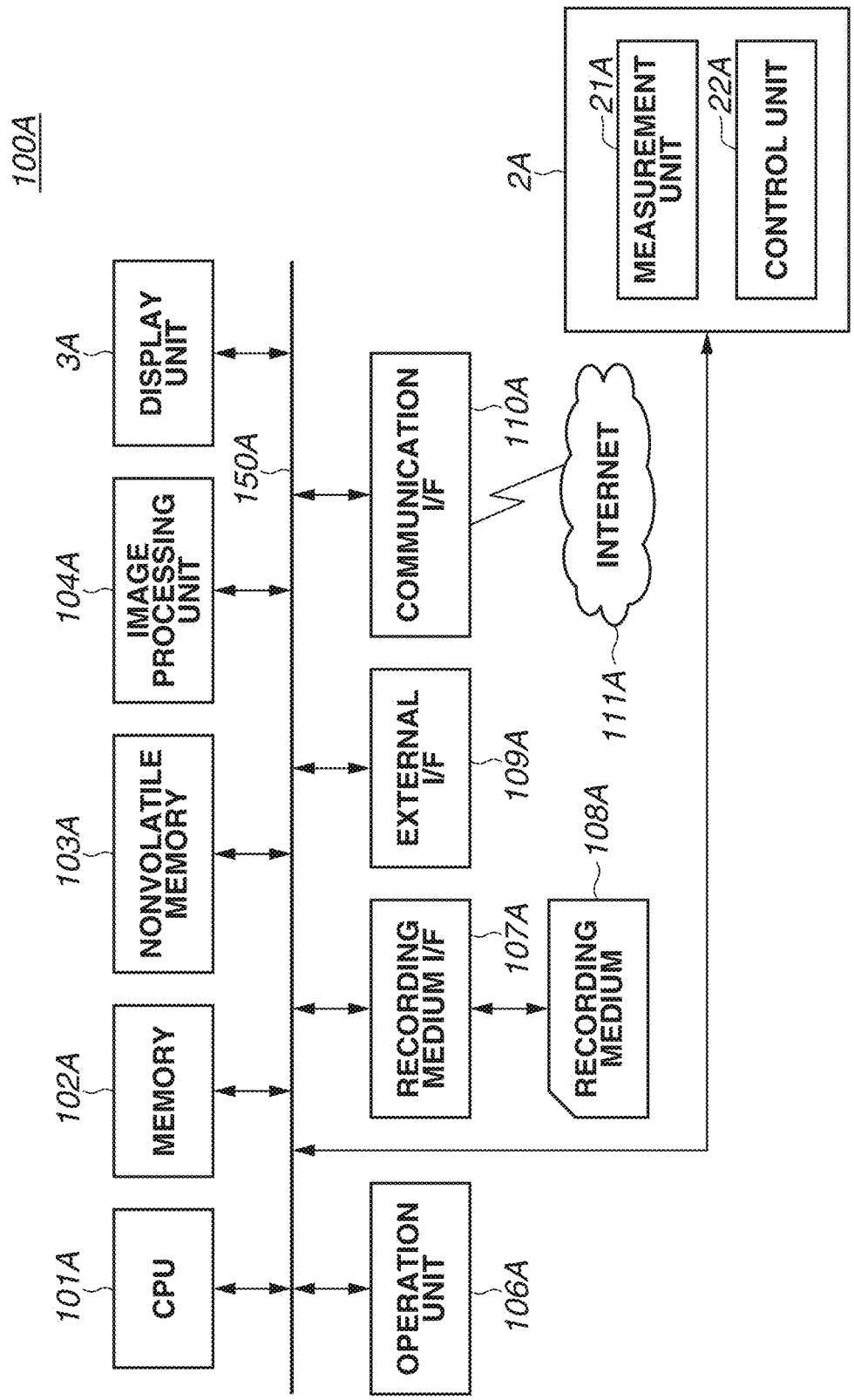
FIG. 5 is a block diagram illustrating a configuration of a system according to the first exemplary embodiment.

A configuration of an electronic apparatus 1A according to the present exemplary embodiment will initially be described with reference to FIG. 5. FIG. 5 is a block diagram illustrating a configuration of a system 100A including the electronic apparatus 1A according to the present exemplary embodiment.

The system 100A according to the present exemplary embodiment includes the electronic apparatus 1A and a measurement apparatus 2A (X-ray apparatus, hyperspectral camera). The electronic apparatus 1A and the measurement apparatus 2A may be connected partly or entirely via a network. The electronic apparatus 1A and a display unit 3A may be separate from each other. The electronic apparatus 1A can communicate with or can control a not-illustrated apparatus for meat processing control in a factory. The network includes a LAN and the Internet.

The measurement apparatus 2A includes a measurement unit 21A and a control unit 22A. The measurement unit 21A is a unit that is controlled by the control unit 22A, measures spectra from not-illustrated meat to be inspected, and obtains spectral data.

The spectral data is not limited to any particular data as long as the data contains intensity values (referred to as "spectral intensities") of a respective plurality of spectral components. For example, data where response intensities (corresponding to spectral intensities) of a response occurring when a stimulus is given to the meat to be inspected are stored in association with measurement parameters (corresponding to spectral components) may be used as the spectral data. Examples of the "stimulus" here include electromagnetic waves, sound, an electromagnetic field, temperature, and humidity.

Specific examples of the spectral data include optical spectral data in an ultraviolet, visible, or infrared range, Raman spectral data, nuclear magnetic resonance (NMR) spectral data, mass spectral data, a liquid chromatogram, a gas chromatogram, and sound frequency spectral data. Raman spectral data includes spontaneous Raman scattering spectral data and nonlinear Raman scattering spectral data. Nonlinear Raman scattering spectroscopy includes stimulated Raman scattering (SRS) spectroscopy, coherent anti-Stokes Raman scattering (CARS) spectroscopy, and coherent Stokes Raman scattering (CSRS) spectroscopy. The spectral data can include at least any one of the following: optical spectral data in an ultraviolet, visible, or infrared range, Raman spectral data, and mass spectral data.

If the spectral data is optical spectral data in an ultraviolet, visible, or infrared range, or Raman spectral data, the spectral components can be wavelengths or wave numbers. If the spectral data is mass spectral data, the spectral components can be mass-to-charge ratios or mass numbers.

The spectral data belongs to any one of groups corresponding to a plurality of components included in the meat to be inspected. The spectral components and the spectral intensities vary depending on the respective components of the meat to be analyzed, included in a measurement area where the spectral data is obtained. The group to which spectral data belongs can be identified by analyzing the spectral data, whereby pieces of spectral data can be attributed to respective components.

The display unit 3A displays a processing result of the electronic apparatus 1A. An image display device such as a flat panel display can be used as the display unit 3A. The display unit 3A can display image data transmitted via an internal bus 150A.

A recording medium 108A stores various types of data. The recording medium 108A can store the spectral data obtained by the measurement apparatus 2A and data for machine learning. The recording medium 108A may store processing results of the electronic apparatus 1A. Various types of data stored in the recording medium 108A can be read and displayed on the display unit 3A as appropriate.

The electronic apparatus 1A may perform processing by using discriminators and spectral data stored in the recording medium 108A. Spectral data measured and generated by other apparatuses may be stored in the recording medium 108A in advance, and the electronic apparatus 1A may process the spectral data.

The electronic apparatus 1A is an apparatus that processes spectral data by using an artificial intelligence (AI) engine based on machine learning.

A CPU 10A, a memory 102A, a nonvolatile memory 103A, an image processing unit 104A, the display unit 3A, an operation unit 106A, a recording medium interface (I/F) 107A, an external I/F 109A, and a communication I/F 110A are connected to the internal bus 150A. The units connected to the internal bus 150A can exchange data with each other via the internal bus 150A.

The memory 102A includes a read only memory (RAM) (volatile memory using semiconductor elements), for example. The CPU 101A controls various units of the electronic apparatus 1A, for example, based on a program stored in the nonvolatile memory 103A by using the memory 102A as a work memory. The nonvolatile memory 103A stores wavelength image data, data about parts of meat, other data, and various programs intended for operation of the CPU 101A. The nonvolatile memory 103A includes a hard disk (HD) and a read-only memory (ROM), for example.

The image processing unit 104A applies various types of image processing to image data stored in the nonvolatile memory 103A and the recording medium 108A, a video signal obtained via the external I/F 109A, and image data obtained via the communication I/F 110A based on control of the CPU 101A. The image processing by the image processing unit 104A includes analog-to-digital (A/D) conversion processing, digital-to-analog (D/A) conversion processing, image data encoding processing, compression processing, decoding processing, enlargement/reduction processing (resizing), noise reduction processing, and color conversion processing. The image processing unit 104A may include a dedicated circuit block for applying specific image processing. Depending on the type of image processing, the CPU 101A may perform the image processing based on a program without using the image processing unit 104A.

The display unit 3A displays images and a graphical user interface (GUI) screen for constituting a GUI based on control of the CPU 101A. The CPU 101A generates a display control signal based on a program, and controls various units of the electronic apparatus 1A to generate a video signal to be displayed on the display unit 3A and output the video signal to the display unit 3A. The display unit 3A displays a video image based on the output video signal. The electronic apparatus 1A may include components up to an I/F for outputting the video signal to be displayed on the display unit 3A, and the display unit 3A may be configured as an external monitor (such as a television set).

The operation unit 106A is an input device for accepting user operations, and includes a text information input device such as a keyboard, a pointing device such as a mouse and a touch panel, a button, a dial, a joystick, a touch sensor, and/or a touch pad. A touch panel is an input device that is flatly configured to overlie the display unit 3A, and outputs coordinate information based on a touched position.

Figure 6A:
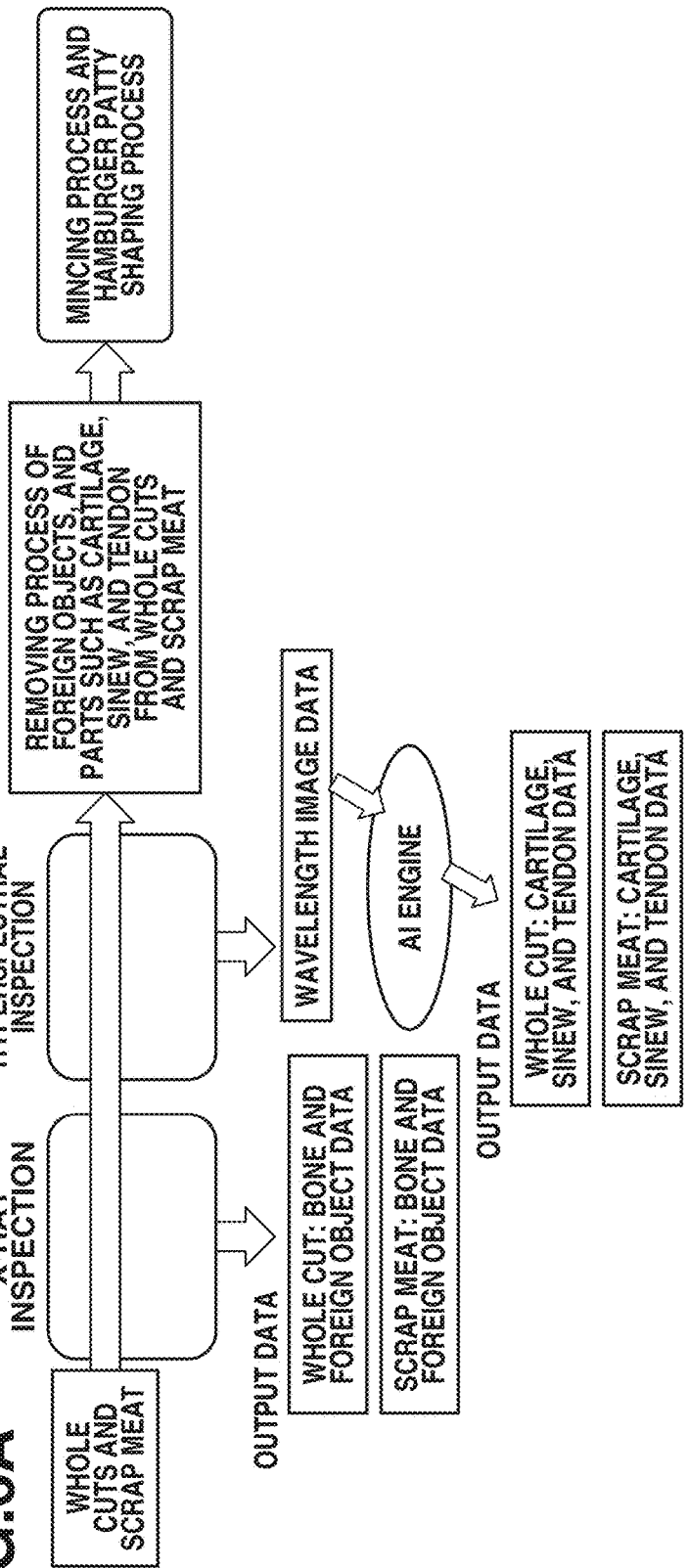
FIGS. 6A and 6B are diagrams illustrating meat processing processes according to the first exemplary embodiment.

The recording medium I/F 107A is configured so that the recording medium 108A such as a memory card, a Compact Disc (CD), and a digital versatile disc (DVD) can be mounted. The recording medium I/F 107A reads data from the mounted recording medium 108A and writes data to the recording medium 108A based on control of the CPU 101A. The external I/F 109A is an I/F for connecting to an external device via a cable or wirelessly, and inputting and outputting video and audio signals. The communication I/F 110A is an I/F for communicating with an external device and the Internet 111A, and transmitting and receiving various types of data such as a file and a command. Meat processing processes according to the present exemplary embodiment will be described with reference to FIGS. 6A and 6B. Meat to be processed illustrated in FIG. 6A is delivered to the processing factory by a meat wholesaler or livestock farmer. Meats to be processed in the meat processing processes include whole cuts that are lumps of meat of mostly the same part and scrap meat that is an aggregate of pieces of meat of various parts not included in the whole cuts. In the present exemplary embodiment, meat processing processes for making hamburger patties will be described. However, the present exemplary embodiment is not limited thereto. It will be understood that the present exemplary embodiment is also applicable to sausages and other processed meat products.

For quality preservation of meat, both whole cuts and scrap meat are sent to the meat processing processes in a frozen state. In particular, scrap meat is a large block formed by aggregating pieces of meat of various parts.

A description will be given with reference to FIG. 6A. An X-ray based inspection (hereinafter, may be referred to as X-ray inspection) is initially performed to detect bones included in whole cuts and scrap meat and check for foreign objects. Whole cuts of meat and lumps of scrap meat are put in a row on a belt conveyor for inspection. If there are bones or foreign objects, the bones or foreign objects are removed in a subsequent process. The X-ray inspection can be performed at a belt conveyor speed of 15 m/min or 25 m/min.

Next, an inspection using a hyperspectral camera that can simultaneously emit a wide wavelength range of light, referred to as a hyperspectral inspection in the present exemplary embodiment, is performed. In the hyperspectral inspection, the obtained wavelength image data is input to the AI engine, and a result about at which positions cartilage, sinew, and tendon are included or whether cartilage, sinew, and tendon are included in scrap meat is output based on machine learning. Like the X-ray inspection, the hyperspectral inspection is also performed with the pieces of meat on the belt conveyor. The belt conveyor is therefore desirably operated at the same speed as with the X-ray inspection. Since the result obtained from the AI engine is output, more hyperspectral cameras can be installed than the X-ray device or the number of AI engines can be increased if the AI engine takes a long time to make a determination. After the X-ray and hyperspectral inspections, whole cuts and scrap meat from which bones, foreign objects, and parts such as cartilage, sinew, and tendon are removed are minced and sent to a process for shaping hamburger patties.

Figure 6B:
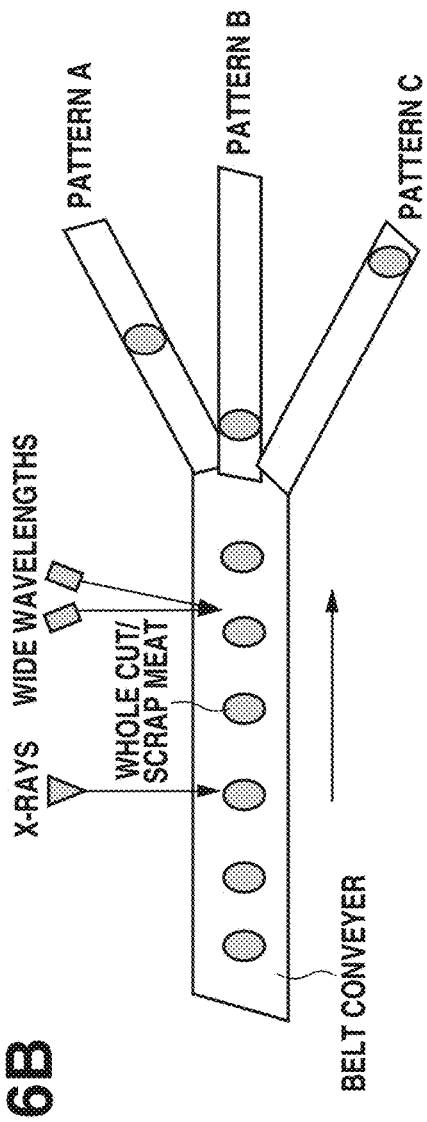

Next, how the X-ray and hyperspectral inspections are performed will be described with reference to FIG. 6B. In the present exemplary embodiment, the X-ray and hyperspectral inspections are performed on the belt conveyor. As illustrated in FIG. 6B, pieces of scrap meat and whole cuts are conveyed on the belt conveyor, and the X-ray inspection is initially performed. Next, the hyperspectral inspection is performed. The belt conveyor moves in the direction of the arrow. Each inspection is thus performed by applying light waves to a piece of meat from above. The light used in the hyperspectral inspection is more likely to reach only near the surface of the inspection target, or equivalently, only objects near the light-irradiated position, compared to the X-rays used in the X-ray inspection. The inspection result of the hyperspectral inspection therefore tends to be limited to a shallower range from the irradiated position.

For the purpose of the hyperspectral inspection, meat can be sliced in thicknesses of 2 to 5 cm in advance. Scrap meat can be sliced depending on the size of parts included. If scrap meat includes parts of 2 to 3 cm in size, the scrap meat can be sliced in thicknesses of 2 to 5 cm or so. Alternatively, for example, scrap meat can be sliced in a thickness such as 10 cm or 8 cm, and both sides of the scrap meat can be inspected. As will be described below, the meat can is classified based on the inspection result. Examples of the classifications include: meat that can be simply sent to a normal mincing process (referred to as pattern A); meat that is subjected to a manual determination (referred to as pattern B); and meat that should not be simply sent to the normal mincing process (referred to as pattern C). For example, the meat classified into pattern C may be minced more finely than the meat of pattern A to make the hardness of cartilage unnoticeable in products. Cartilage portions may be cut away and the remaining meat may be minced like the meat of pattern A. The meat of pattern B is manually inspected and classified between pattern A and pattern C. The accuracy of inspection can be improved by using the data on the meat of pattern B as training data for the AI engine. The X-ray and hyperspectral inspections may be performed on scrap meat alone.

Figure 7A:
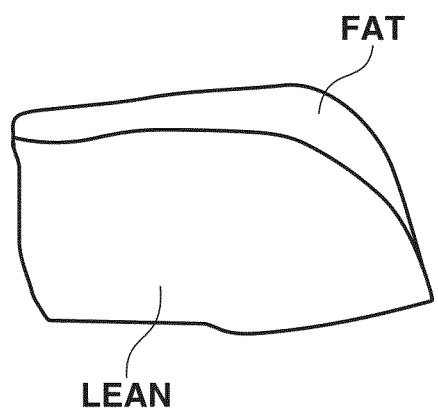
FIGS. 7A and 7B are diagrams illustrating an example of scrap meat according to the first exemplary embodiment.
Figure 7B:
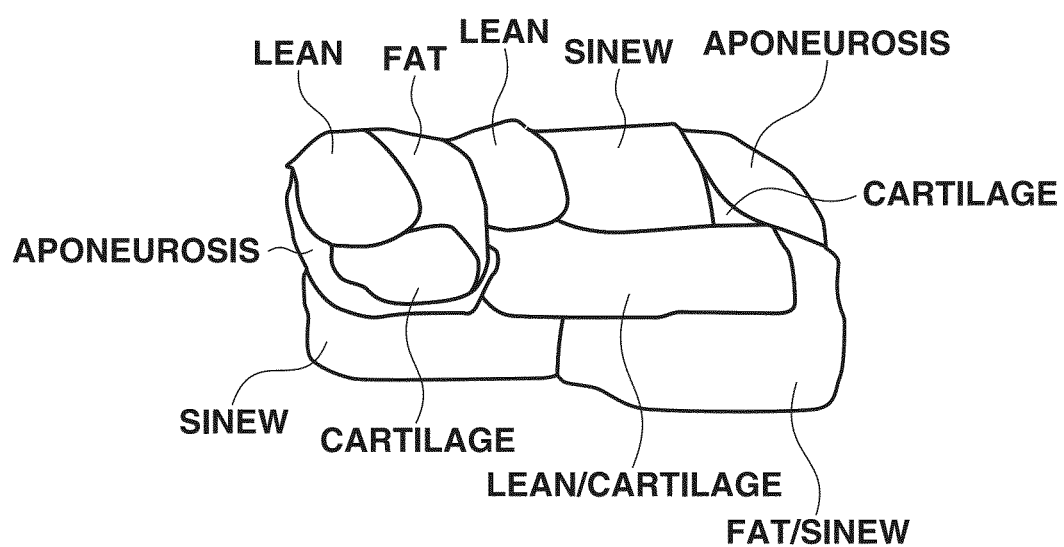

Next, a lump of meat called scrap meat according to the present exemplary embodiment will be described with reference to FIGS. 7A and 7B. FIG. 7A illustrates an example of a whole cut. FIG. 7B illustrates an example of scrap meat. FIG. 7A illustrates a whole cut including lean and fat. Since the positional relationship between parts in a whole cut is known, the absence of cartilage in the whole cut including lean and fat illustrated in FIG. 7A, for example, can sometimes be known without an inspection. As illustrated in FIG. 7B, scrap meat is an aggregate of small cuts formed regardless of the original positional relationship between the parts.

Figure 8:
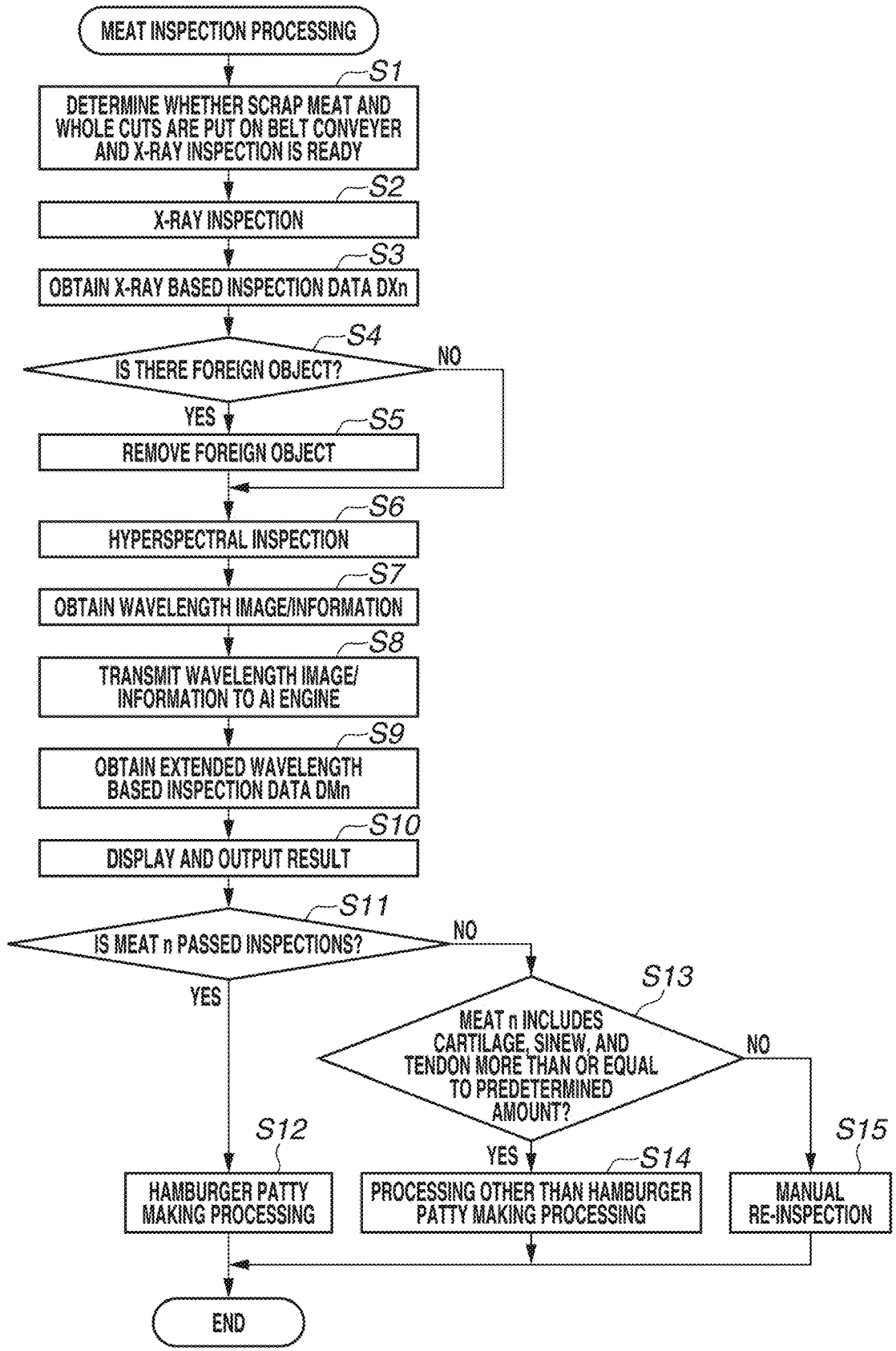
FIG. 8 is a flowchart illustrating meat inspection processing according to the first exemplary embodiment.

Meat inspection processing according to the present exemplary embodiment will be described with reference to FIG. 8. FIG. 8 illustrates a flowchart of the meat inspection processing. This processing corresponds to the X-ray and hyperspectral inspections in FIGS. 6A and 6B.

The meat inspection processing is implemented by the CPU 101A loading a program recorded in the nonvolatile memory 103A into the memory 102A and executing the program. This processing is started when the electronic apparatus 1A is powered on and becomes ready for the X-ray and hyperspectral inspections.

In step S1, the CPU 101A determines whether scrap meat and whole cuts are put on the belt conveyor and the X-ray inspection can be performed.

In step S2, the CPU 101A irradiates the scrap meat and the whole cuts with X-rays and performs an X-ray based inspection.

In step S3, the CPU 101A obtains X-ray based inspection data DXn. n is a number for identification, assigned to each piece of scrap meat or whole cut. The inspection data DXn may include information only about the presence or absence of a bone or foreign object, or include coordinate information indicating where the bone or foreign object is. The inspection data DXn may be image data indicating whether a bone or foreign object is included. The inspection data DXn obtained in step S3 is recorded on the recording medium 108A. If a bone is included in a whole cut, the inspection data DXn may include only information about the presence or absence of the bone. If a bone is included in scrap meat, the inspection data DXn may include information about the presence or absence of the bone and the position of the bone. If a whole cut includes a bone, almost the entire lump is likely to be bone. By contrast, if scrap meat includes a bone, the lump is likely to be bone in part. In the case of a whole cut, the indication of the presence or absence of a bone therefore enables a quick understanding of whether the lump itself can be used for processing. On the other hand, in the case of scrap meat, the indication of the position of a bone enables processing for removing the bone afterward. The inspection data DXn may indicate the ratio or area of bones included.

The result of the X-ray based inspection may be displayed on the display unit 3A after the X-ray inspection and before the hyperspectral camera inspection. The result of the X-ray based inspection may be displayed with that of the hyperspectral inspection. If the ratio or size of bones (in a piece of meat) is determined to be greater than or equal to a threshold, the whole cut or scrap meat may be discarded or used for other processing without a hyperspectral inspection.

In step S4, the CPU 101A determines whether there is a foreign object. If there is a foreign object (YES in step S4), the processing proceeds to step S5. In step S5, the CPU 101A performs processing for removing the foreign object. If there is no foreign object (NO in step S4), the processing proceeds to step S6. If a foreign object is included, the entire whole cut or the entire piece of scrap meat may be discarded. If a bone is included, the CPU 101A may perform processing for removing the bone portion.

In step S6, the CPU 101A performs an inspection in an extended wavelength band, i.e., a hyperspectral inspection. In step S6, if the whole cut or the scrap meat has a thickness greater than a threshold (such as 4 or 5 cm), the CPU 101A may display an alert to notify the user that the inspection is unable to be appropriately performed. If the thickness is greater than the threshold, both sides of the meat may be inspected. The CPU 101A also issues a notification to the user if the moving speed of the belt conveyer is higher than a speed at which the hyperspectral inspection can be performed, or if the belt conveyer stops due to some reasons. In particular, since an extended period of heat application is undesirable in handling food, the CPU 101A desirably prevents the meat from being irradiated with light for a predetermined time or more.

In step S7, the CPU 101A obtains a wavelength image/information indicating the inspection result of step S6.

In step S8, the CPU 101A transmits the wavelength image/information obtained in step S7 to the not-illustrated AI engine. While, according to the present exemplary embodiment, The AI engine is located on a server, the electronic apparatus 1A may include the AI engine.

In step S9, the CPU 101A obtains extended wavelength based inspection data DMn from the AI engine. n is a number for identification, assigned to each piece of scrap meat or whole cut. The inspection data DMn includes data indicating the sizes and ratios of respective parts, data indicating the positions of the respective parts, and/or data indicating whether cartilage, sinew, and tendon of predetermined size or more are included. If a predetermined amount or more, e.g., 20% or more of cartilage, sinew, or tendon is included with respect to the area of scarp meat, or if a chunk of predetermined size or more is included, the meat is recorded in data as NG, and classified into pattern C. If meat is determined as OK, the meat is classified into pattern A. The inspection data DMn may include information indicating the areas of the respective parts. Since what the user wants to know by this inspection is information about, e.g., whether cartilage, sinew, and tendon are included, such information that the user wants to know may be obtained in detail. Specifically, information about cartilage, sinew, and tendon may be obtained in detail, like how much parts are located at which positions, while information about lean and fat is obtained only in a rough ratio, like what percentage the other parts occupy, or no information may be obtained at all. Obtaining detailed information about parts of interest and only rough information about other parts in such a manner can reduce the processing load of the AI engine for reduced inspection time. The AI engine may detect lean and fat to determine whether other parts such as cartilage, sinew, and tendon are included. The AI engine may detect cartilage, sinew, and tendon. The AI engine may perform machine learning by using the data on lean and fat as training data. The AI engine may perform machine learning by using the data on cartilage, sinew, and tendon as training data.

In step S10, the CPU 101A displays and outputs the result of the hyperspectral inspection based on the inspection data obtained in step S9. The display of the result will be described with reference to FIGS. 9A, 9B, 9C, 9D, 9E, 9F, and 9G.

FIG. 9A illustrates parts included in scrap meat in different colors based on the hyperspectral inspection. Parts 501 represent tendon, parts 502 cartilage, parts 503 sinew, parts 504 lean, and a part 505 fat. Parts 506 represent unknown parts that are high likely to include a mixture of a plurality of parts. The parts 506 are displayed in a color different from those representing the respective parts. For example, if a target portion is likely to be lean (with a predetermined probability or more) based on the result output from the AI engine, the target portion is displayed in red. If a target portion is likely to include lean and sinew and less likely to include lean alone (with a predetermined probability or less), the target portion may be displayed in gray or white. In other words, if the part of the target portion can be identified (determined to have a high probability), the target portion is displayed in a color other than black or white. If the part of the target portion is unknown, or not determinable because the target portion includes a mixture of a plurality of parts, the target portion is displayed in black and white. The use of different colors enables the user to figure out which parts can be clearly determined and which parts are not by the AI engine.

FIG. 9B illustrates a result where patterns A, B, and C are displayed in different colors or display modes based on the hyperspectral inspection. Portions 506 represent pattern C, a portion 507 pattern A, and portions 508 pattern B. Displaying the patterns in respective different colors or display modes enables the user to instantaneously recognize whether the meat is OK or NG. Portions of pattern B may be blinked. For example, if the user manually classifies a lump of meat between OK and NG based on its display result, the blinking can provide an instantaneous notification of whether the meat is OK or NG, and if there is a portion of pattern B, that detailed observation is needed.

FIG. 9C illustrates the ratios of respective parts in numerals based on the hyperspectral inspection. Such an output of the result enables the user to easily determine patterns A and B if numerical thresholds are provided. The result of FIG. 9C may be displayed to the user, or the CPU 101A may make a determination based on the result and the result can be referred to by the user afterward.

FIG. 9D illustrates the ratios of the respective patterns.

FIG. 9E illustrates the ratios of pattern A and C. For pattern B, what percentage of portions included in a mixture of which parts is specifically displayed.

FIG. 9F illustrates the ratios of portions determined to be highly probable to be NG and OK, as well as the ratio of portions likely to include a mixture of fat and sinew and the ratio of portions likely to include a mixture of lean and cartilage. That sinew is likely to occupy one half or more of the mixture of fat and sinew is also displayed. For example, if the ratio of NG parts included is 30% or more and the possibility of being an NG part is 15% or more, that portion may be determined to be pattern C. If, for example, the ratio of NG parts included is 30% or more and the possibility of being an NG part is less than 150%, that portion may be classified into pattern B for manual determination.

FIG. 9G illustrates the ratios of portions that are likely to be NG or OK and, in parentheses, the ratio of portions that can be NG or OK. The user can figure out the rough ratio of the NG portions and do an actual check.

As employed herein, being likely to be NG or OK means that the A engine determines that the part is NG or OK. If the A engine determines that a part can be sinew or can be lean with a low probability, the part can be so but with not much likelihood.

In step S11, the CPU 101A determines whether the meat n to be determined by the AI engine at present is OK. In other words, in step S1, the CPU 101A determines whether the meat n is of pattern A. In step S11, if the meat n is determined to be OK (YES in step S11), the processing proceeds to step S12. If not (NO in step S11), the processing proceeds to step S13.

In step S12, the CPU 101A sends the meat n to hamburger patty making processing.

In step S13, the CPU 101A determines whether the meat n is clearly NG. In other words, in step S13, the CPU 101A determines whether the meat n is of pattern C. If whether the meat n is of pattern C or pattern B is unknown, the determination of step S13 is NO. For example, suppose that meat including 20% or more of cartilage and sinew is determined to be of pattern C. If the meat n includes 18% of cartilage and sinew and 10% of a mixture of cartilage and lean, the determination of step S13 is NO. Making a "NO" determination in such a case where the meat n does not exceed the threshold for determining that meat is clearly of pattern C can reduce the amount of meat unused to make hamburger patties. If the determination of step S13 is YES (YES in step S13), the processing proceeds to step S14. If not (NO in step S13), the processing proceeds to step S15.

In step S14, the CPU 101A sends the meat n to processing other than the hamburger patty making processing. For example, if scrap meat is determined to be clearly NG in step S13, the scrap meat may be more finely minced than usual, used for processed food of which different texture is desired, or used to make soup stock.

In step S15, the meat n is manually inspected again, and the CPU 101A determines which to classify the meat n into, pattern A or pattern C. The determination performance of the AI engine can be improved by using the result of the manual re-inspection as teaching data for the AI engine.

According to the exemplary embodiment described above, the user can more easily understand the result of the meat inspection for performing processing.

Cartilage and sinew may be determined as the same part, not separate parts, since cartilage and sinew have similar characteristics in a wavelength image. The results concerning cartilage and sinew may be collectively displayed to the user or indicated by a numerical value. This facilitates the user to figure out the ratio of hard parts. Cartilage portions may be blinked so that the user can remove the portions as appropriate. Detection of gloves, plastic bags, and container chips as foreign objects can reduce manual operations and improve the accuracy of inspection as well.

If the inspection result is displayed to the user as an image, portions to be removed, such as cartilage, sinew, and foreign objects, may be displayed in an easily understandable manner, along with an indication of the number of parts to be removed. This clearly shows the user the portions and areas to be removed and enables the user to perform the removal at a time for efficient operation. In particular, since large pieces of cartilage can be left as unpleasant texture in processed products, pieces of cartilage greater than or equal to a predetermined size, like greater than or equal to 2 cm, may be presented to the user so that the pieces of cartilages are removed without fail. If there is a piece of cartilage greater than or equal to a predetermined size, the meat may be classified as NG (pattern C) without exception.

Whether the target scrap meat includes an unsuitable amount of cartilage for making the intended processed food may be determined by adding the amount of portions determined to be likely to be cartilage by the AI engine to the amount of portions that can be cartilage with weights.

NG portions such as cartilage, sinew, and tendon may be displayed in a single color while OK portions are finely displayed on the image in different colors part by part, and vice versa.

The result of the X-ray inspection and the result of the hyperspectral inspection may be displayed together. In other words, a result concerning detected foreign objects and information about cartilage and lean may be output together. A metal detector may be used along with the X-ray inspection. Either one may be used alone.

The foregoing exemplary embodiments have been described by using meat to be processed to make hamburger patties as an example. However, this is not restrictive, and the foregoing exemplary embodiments can be used for various types of food, including fruit, vegetables, fish, grain, water, oil, spice, and seaweed. It will be understood that the exemplary embodiments are not limited to food but are also applicable in recycling plants.

The foregoing various controls described to be performed by the CPU 101A may be performed by a single piece of hardware. A plurality of pieces of hardware may control the entire electronic apparatus 1A by sharing processing.

While exemplary embodiments of the present disclosure have been described in detail above, the present disclosure is not limited to such specific exemplary embodiments. Various modes not departing from the gist of the disclosure are also included in the present disclosure. The foregoing exemplary embodiments are merely examples of the present disclosure, and the exemplary embodiments may be combined as appropriate.

The foregoing exemplary embodiments have been described by using cases where the exemplary embodiments are applied to an electronic apparatus as examples. However, the exemplary embodiments are not limited to such examples, and are applicable to any electronic apparatuses that can control output of an inspection result. Specifically, an exemplary embodiment of the present disclosure can be applied to a mobile phone terminal, a portable terminal device, a terminal usable in a factory, a digital photo frame, a music player, a game machine, and an electronic book reader.

An exemplary embodiment of the present disclosure is also implemented by performing the following processing. The processing includes supplying software (program) for implementing the functions of the foregoing exemplary embodiments to a system or an apparatus via a network or various recording media, and reading and executing the program code by a computer (or CPU or MPU) of the system or apparatus. In such a case, the program and a recording media storing the program constitute exemplary embodiments of the present disclosure.

As an effect of an exemplary embodiment of the present disclosure, both a high accuracy of analysis and improved efficiency can be achieved in a compatible manner in analyzing a target by using a plurality of spectral components.

As an effect of an exemplary embodiment of the present disclosure, both a high accuracy of analysis and protection of an analysis target can be achieved in a compatible manner in analyzing the target by using a plurality of spectral components even if the analysis target is vulnerable to heat.

As an effect of an exemplary embodiment of the present disclosure, an apparatus or method for outputting a result of an inspection performed in the process of executing predetermined processing can be provided.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Applications No. 2019-080190, filed Apr. 19, 2019, No. 2019-080191, filed Apr. 19, 2019, and No. 2019-080192, filed Apr. 19, 2019, which are hereby incorporated by reference herein in their entirety.

What is claimed is:

1. An electronic apparatus comprising:
at least one processor; and
a memory configured to store a program that, when executed by the at least one processor, causes the at least one processor to function as:
    a selection unit configured to select any one of a plurality of parameters generated in advance, and
    an analysis unit configured to receive light reflected from food to be analyzed and perform an analysis of spectral data by using the parameter selected by the selection unit, the spectral data indicating spectral intensities of a plurality of spectral components,
    wherein the selection unit is configured to select any one of the plurality of parameters based on at least any one of a type of the food to be analyzed, a demanded accuracy of the analysis, and processing to be performed after the analysis,
    wherein the food to be analyzed is meat,
    wherein the analysis unit is configured to discriminate at least any one of cartilage, tendon, and sinew included in the meat to be analyzed, by performing the analysis of the spectral data,
    wherein the plurality of parameters includes a parameter generated by machine learning using positive teaching data and a parameter generated by machine learning using negative teaching data, and
    wherein the selection unit is configured to select any one of the plurality of parameters based on a part of meat to be discriminated.

2. The electronic apparatus according to claim 1, wherein the plurality of parameters is generated based on machine learning using teaching data.

3. The electronic apparatus according to claim 1, wherein the analysis unit is configured to output an analysis result based on at least either an area of regions discriminated to be a same part or a degree of distribution of the regions discriminated to be the same part.

4. The electronic apparatus according to claim 1, wherein the selection unit is configured to select any one of the plurality of parameters based on a type of the meat.

5. The electronic apparatus according to claim 4, wherein the selection unit is configured to select any one of the plurality of parameters based on a place of production of the meat.

6. The electronic apparatus according to claim 1, wherein the selection unit is configured to select any one of the plurality of parameters based on a processing process to be performed on the meat to be analyzed after the analysis by the analysis unit.

7. The electronic apparatus according to claim 1, wherein the analysis unit is configured to, if the meat to be analyzed is scrap meat, perform the analysis based on spectral data at each coordinate, and if the meat to be analyzed is a whole cut of meat, perform the analysis based on spectral data in each area including a plurality of coordinates, the scrap meat being an aggregate of a plurality of pieces of meat.

8. The electronic apparatus according to claim 1, wherein the analysis unit is configured to perform the analysis focusing on a specific spectral component based on the parts of meat.

9. The electronic apparatus according to claim 1, wherein at least any one of the type of the food to be analyzed, the demanded accuracy of the analysis, and the processing to be performed after the analysis is set by a user.

10. The electronic apparatus according to claim 1, the program causes the at least one processor to further function as:
- a generation unit configured to receive the light reflected from the food to be analyzed, the light being irradiated by an illumination source, and to generate the spectral data, and
- a control unit configured to control the illumination source,
- wherein the control unit is configured to adjust an amount of light of the illumination source, based on at least either a moving speed of the food or a distance between the food and the illumination source.

11. An analysis system comprising:
an electronic apparatus including:
at least one processor; and
a memory configured to store a program that, when executed by the at least one processor, causes the at least one processor to function as:
- a selection unit configured to select any one of a plurality of parameters generated in advance,
- an analysis unit configured to receive light reflected from food to be analyzed and perform an analysis of spectral data by using the parameter selected by the selection unit, the spectral data indicating spectral intensities of a plurality of spectral components,
- wherein the selection unit is configured to select any one of the plurality of parameters based on at least any one of a type of the food to be analyzed, a demanded accuracy of the analysis, and processing to be performed after the analysis,
- wherein the food to be analyzed is meat,
- wherein the analysis unit is configured to discriminate at least any one of cartilage, tendon, and sinew included in the meat to be analyzed, by performing the analysis of the spectral data,
- wherein the plurality of parameters includes a parameter generated by machine learning using positive teaching data and a parameter generated by machine learning using negative teaching data, and
- wherein the selection unit is configured to select any one of the plurality of parameters based on a part of meat to be discriminated.

12. A control method of an electronic apparatus, comprising:
selecting any one of a plurality of parameters generated in advance; and
receiving light reflected from food to be analyzed and performing an analysis of spectral data by using the selected parameter, the spectral data indicating spectral intensities of a plurality of spectral components,
wherein any one of the plurality of parameters is selected based on at least any one of a type of the food to be analyzed, a demanded accuracy of the analysis, and processing to be performed after the analysis,
wherein the plurality of parameters includes a parameter generated by machine learning using positive teaching data and a parameter generated by machine learning using negative teaching data,
wherein the food to be analyzed is meat,
wherein at least any one of cartilage, tendon, and sinew included in the meat to be analyzed is discriminated by performing the analysis of the spectral data, and
wherein any one of the plurality of parameters is selected based on a part of meat to be discriminated.

13. A non-transitory computer-readable storage medium storing a program for causing a computer to execute the control method according to claim 12.

* * * * *